March 20, 1945. J. R. GAMMETER ET AL 2,371,883
DIPPED SYNTHETIC RUBBER ARTICLE AND METHOD OF MAKING
Filed Nov. 6, 1943
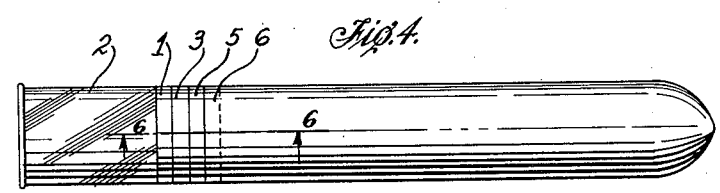
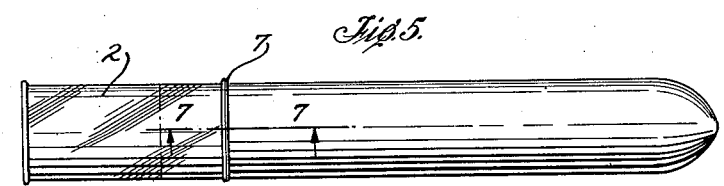
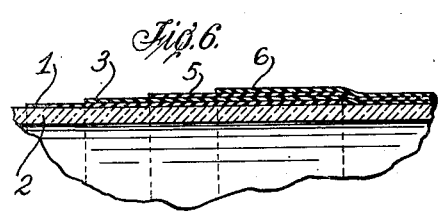
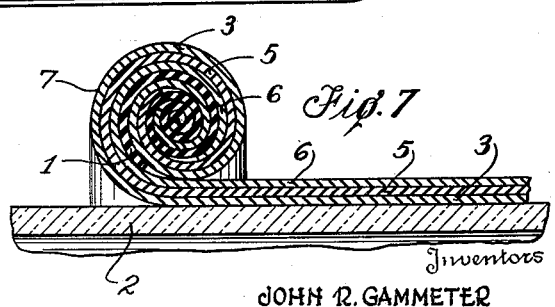
Inventors
JOHN R. GAMMETER
& MICHAEL J. VASSEL
By Richey & Watts
Attorneys Patented Mar. 20, 1945

2,371,883

UNITED STATES PATENT OFFICE 2,371,883

DIPPED SYNTHETIC RUBBER ARTICLE AND METHOD OF MAKING

John R. Gammeter and Michael J. Vassel, Akron, Ohio; said Vassel assignor to said Gammeter Application November 6, 1943, Serial No. 509,182

11 Claims. (Cl. 18—58)

This invention relates generally to the art of dipped rubber articles and particularly to dipped articles composed of synthetic rubber and having strengthening beads around the open ends thereof, and to a new and improved method of making such articles.

Dipped articles such as gloves, nipples, finger cots, prophylactics and the like have been made heretofore from natural rubber by dipping forms of appropriate size and shape into solutions of rubber, or dispersions of rubber such as latex, and then rolling the deposited film of rubber on itself to form strengthening beads or rings at the open ends of the articles. The wet or uncured film has sufficient tensile strength to be rolled into a strengthening bead and the convolutions adhere to each other when wet or uncured as well as when dry or cured.

There are certain synthetic rubbers having properties which would make them available for use in manufacturing dipped articles. Such synthetic rubbers include neoprene, HyCar and Buna-S. However, strengthening beads cannot be formed by rolling films of such synthetic rubbers upon themselves after the manner above described with respect to natural rubbers. The tensile strength of a film of such synthetic rubbers on a dipping form and before drying or curing is so low that when attempts are made to roll such a film upon itself the material tears and crumbles and prevents the formation of a continuous strengthening bead around the form. Consequently, it has been impossible heretofore to make dipped articles composed of such synthetic rubbers, so far as we are advised.

The present invention makes it possible to produce dipped synthetic rubber articles with strengthening bears at their open ends. This result is attained by providing the open end of a film of such synthetic rubber on a dipping form with means which, while wet or uncured, will adhere to that film and which has sufficient tensile strength to be rolled into a bead and to support and roll the film into a bead.

In the drawing accompanying and forming a part of this specification,

Figure 1 is a side elevational view of a dipping form provided with a film of natural rubber to form part of a strengthening bead for a dipped synthetic rubber article;

Figure 2 is a view similar to Fig. 1 but showing a film of synthetic rubber on said form and overlapping part of the layer of natural rubber;

Figs. 3 and 4 are similar to Fig. 2 but showing additional layers of synthetic rubber on the form;

Fig. 5 is a view similar to Fig. 4 but with the several films rolled into a strengthening bead;

Fig. 6 is a fragmentary cross-sectional view taken on line 6—6 of Fig. 4; and

Fig. 7 is a fragmentary sectional view taken on line 7—7 of Fig. 5.

The present invention will be better understood by those skilled in the art by the following description which is given as an illustration but not as a limitation.

A dipping bath of depth suitable for the length of the desired articles is provided and consists of neoprene latex which may be made from chloroprene by polymerization in the presence of water, an emulsifier and a catalyst. Dipping forms of a size and shape suitable for the desired articles are provided with a narrow layer of latex placed around the forms at a distance from the closed ends of the forms which is slightly greater than the desired length of the finished articles. This layer may be from about 1" to about 1½" wide and about .001" thick. This layer of latex may be sprayed, painted or otherwise conveniently placed on the forms. Such a layer of latex is shown at 1 on form 2 in Fig. 1.

After the layer of latex is partly dried, the forms provided with such layers of latex are dipped into the bath to form a film of neoprene covering the portion of the form between its closed end and the latex layer and overlapping part of the latter. Such a film of neoprene is shown at 3 in Fig. 2, the open end of this film terminating at line 4, which leaves part of the layer 1 of latex exposed. If desired, additional films of neoprene may be deposited on the form by subsequent dipping steps, but preferably the succeeding films should be successively shorter in length so that each succeeding film does not extend for the full length of the preceding film. In Figs. 3 and 4 additional films 5 and 6 have been formed on film 3 by two separate dipping steps. The relation of the layer 1 and films 3, 5 and 6 is better shown in enlarged view 6.

To form the strengthening bead at the open end of the article the latex layer 1 is rolled upon itself toward the closed end of the form and then is progressively rolled upon films 3, 5 and 6 to form strengthening bead 7 which is shown in Fig. 5 and in enlarged detail in Fig. 7.

Since the latex layer, while moist or wet, is sufficiently strong and resilient to be rolled and to support and roll an adhering film of moist synthetic rubber, a strengthening bead can be made at the open end of the article above described by rolling the latex layer upon itself and then upon the layer or layers of neoprene. Since the rubber layer is rolled upon itself before it is rolled onto the film, the rolled rubber constitutes the core of the final bead, the remainder of the bead consisting of the layer and film alternately disposed in several convolutions. After the strengthening bead has been made in this manner the article on the form may be dried and cured in any ordinary well known manner, and the cured article may be removed from the form for further processing or treatment, as desired.

It will be understood that the present invention is not limited to the use of latex as the layer-forming material, for other rubber dispersions, or rubber solutions which can be placed as a layer on a dipping form and which will adhere to themselves and to synthetic rubber films when wet may be used. Likewise, this invention is not limited to neoprene, for it may include other synthetic rubbers such as HyCar and Buna-S, which are suitable for the making of dipped articles and which can not be rolled on themselves when moist or wet to form a satisfactory strengthening bead.

If desired, the layer material may be given a color different from that of the film material. For instance, the latex layer I of the figures may be colored red or any other color which contrasts with the straw-colored neoprene and will serve as a guide to indicate the extent of overlap of the neoprene on the latex layer and may also serve as a trade-mark when the bead rolling is not carried to the extent of rolling all the latex layer within the neoprene film. However, it is preferable to roll the bead far enough so that the synthetic rubber film completely encloses and covers the latex layer and the synthetic rubber surfaces engage each other. After the articles of this invention have been dried and cured the bead is substantially permanent, that is, it cannot be unrolled.

Having thus described the invention so that others skilled in the art may be able to understand and practice the same, we state that what we desire to secure by Letters Patent is defined in what is claimed.

What is claimed is:

1. The method of making dipped articles which comprises the steps of placing a narrow layer of natural rubber around a dipping form, providing a film of synthetic rubber on said form and overlapping part of the outer surface of said layer of natural rubber by dipping the form into a liquid which contains synthetic rubber, rolling the said layer on itself and then upon said film to form a bead, and drying and curing said article.

2. The method of making dipped articles which comprises the steps of placing a narrow layer of natural rubber around a dipping form, dipping the form into a synthetic rubber emulsion to provide a film on the form and overlapping part of the outer surface of said layer, rolling the said layer on itself and then upon the film to form a bead, and drying and curing said article.

3. The method of making dipped articles which comprises the steps of placing a narrow layer of latex around a dipping form, dipping the form into a synthetic rubber emulsion to provide a film on the form and overlapping part of the outer surface of said latex layer, rolling the latex layer on itself and then on the synthetic film to form a bead, and drying and curing said article.

4. The method of making dipped articles which comprises the steps of placing a narrow layer of natural rubber around a dipping form, dipping the form into an emulsion of neoprene to provide a film of neoprene on the form and overlapping part of the outer surface of said layer, rolling the said layer on itself and on said neoprene to form a bead, and drying and curing said article.

5. The method of making dipped articles which comprises the steps of placing a narrow layer of latex rubber around a dipping form, dipping the form into an emulsion of neoprene to provide a film of neoprene on the form and overlapping part of the outer surface of said layer, rolling the said latex layer on itself and then on said neoprene film to form a bead, and drying and curing said article.

6. A dipped article comprising synthetic rubber and having a rolled strengthening bead composed in part of natural rubber.

7. A dipped article comprising neoprene and having a rolled strengthening bead composed in part of natural rubber.

8. A dipped article comprising synthetic rubber and having a rolled strengthening bead composed in part of latex.

9. A dipped article comprising synthetic rubber and having a rolled strengthening bead composed of rolled layers of latex and synthetic rubber.

10. A dipped article comprising neoprene and having a rolled strengthening bead composed of rolled layers of latex and neoprene.

11. A dipped article comprising synthetic rubber and having a rolled strengthening bead composed of a core of natural rubber and surrounding convolutions composed of alternate layers of natural rubber and films of synthetic rubber.

JOHN R. GAMMETER.
MICHAEL J. VASSEL.